(12) United States Patent
Hansen et al.

(10) Patent No.: US 7,652,622 B2
(45) Date of Patent: Jan. 26, 2010

(54) TRANSFER OF POSITION INFORMATION OF MOBILE TERMINAL

(75) Inventors: Paul Hansen, Cambridge (GB); Peter James Duffett-Smith, Cambridge (GB); Anthony Richard Pratt, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 134 days.

(21) Appl. No.: 11/919,486

(22) PCT Filed: Apr. 25, 2006

(86) PCT No.: PCT/EP2006/061797
§ 371 (c)(1),
(2), (4) Date: Oct. 29, 2007

(87) PCT Pub. No.: WO2006/114408

PCT Pub. Date: Nov. 2, 2006

(65) Prior Publication Data

US 2009/0073030 A1 Mar. 19, 2009

(30) Foreign Application Priority Data

Apr. 28, 2005 (EP) .................................. 05252653

(51) Int. Cl.
*H04B 7/185* (2006.01)
(52) U.S. Cl. .............................. 342/357.08; 342/357.03; 342/357.09; 342/357.1; 342/357.14; 342/357.15
(58) Field of Classification Search . 342/357.08–357.1, 342/357.03, 357.14, 357.15; 455/456.1–457
See application file for complete search history.

(56) References Cited

U.S. PATENT DOCUMENTS

| 6,611,688 B1 | 8/2003 | Raith |
| 2003/0045304 A1 | 3/2003 | Shamoto et al. |

FOREIGN PATENT DOCUMENTS

| EP | 1 235 076 | 8/2002 |
| WO | WO 02/23216 | 3/2002 |
| WO | WO 2005/071430 A1 * | 8/2005 |

OTHER PUBLICATIONS

B. Peterson et al., Design and performance of an integrated DGPS/LORAN receiver, IEEE Position Location and Navigation Symposium, p. 213-220, Mar. 2000.*

* cited by examiner

*Primary Examiner*—Thomas H Tarcza
*Assistant Examiner*—Fred H Mull
(74) *Attorney, Agent, or Firm*—Roylance, Abrams, Berdo & Goodman, L.L.P.

(57) ABSTRACT

The invention provides a method of combining satellite positioning system signals and position information derived from such signals in a mobile terminal, when these are available at a first location, with cellular communication signals and a method, system and apparatus for determining the approximate position information for the said mobile terminal when SPS signals are not available at a second location. The approximate position is determined in the mobile terminal only using a position difference vector derived from the cellular communication signals using time offsets in a method based on the observed time difference of arrival. The computations of cellular position and position difference information are made within the network infrastructure. The invention provides for the security of the user as only position difference information is communicated over the air interface, or transmission time offset measurements which require non-transmitted information to determine a solution. In a further aspect of the invention, the approximate position information is used to provide position assistance information to an SPS receiver for the purposes of (a) satellite signal acquisition with reduced search time and/or (b) initial position information for the calculation of SPS location which thereby avoids the 'integer ambiguity' problem resulting from the repetitive nature of the SPS ranging signals. In a further aspect of the invention, a method is disclosed whereby a plurality of cellular positioning measurements are combined, initially with SPS measurements and then without such measurements, to provide a combined cellular position information with improved accuracy and a dynamic model.

21 Claims, 6 Drawing Sheets

TRANSFER OF POSITION INFORMATION OF MOBILE TERMINAL

FIELD OF TECHNOLOGY

The present invention relates to systems in which it is required to provide position information assistance to a receiver of a satellite positioning system carried within a mobile terminal, for the purpose of assisting the satellite receiver to acquire satellite signals in order for it to compute an accurate position. A second aspect of the invention provides initial position information for the process of calculating position information within the satellite positioning receiver thereby providing accurate position in a shorter time than is otherwise possible from a cold start.

More specifically, the invention relates to the transfer of position information to mobile terminals using positioning systems based on signals received from transmission sources. Of particular interest is a mobile terminal using radio signals received from both a satellite positioning system (such as the Global Positioning System, GPS) and a terrestrial cellular radio network.

BACKGROUND

Technology for positioning mobile radio terminals using the signals received from one or more transmitters has been widely used for many years. Such systems include terrestrial networks of transmitters (e.g. Loran) and satellite constellations (e.g. GPS, GLONASS and Galileo) deployed specifically for the purpose of locating the receiver, as well as methods that use general-purpose radio networks such as cellular mobile telephone networks (e.g. WO-A-97-11384) or TV and radio transmitter networks. (e.g. EP-A-0303371).

Within a cellular mobile telephone network, for example, the position of the terminal may be based on the identity of the serving cell, augmented by information such as the signal transmission time delay between the serving transmitter and terminal, the strengths of signals received from the serving and neighbouring transmitters, or the azimuth angles of incidence of received signals. An improved position may be obtained using the observed time difference of arrival (OTDA) of signals received at the terminal from two or more transmission sources.

OTDA methods give good position accuracy using only the signals available within the cellular radio network. However, they require the precise transmission time offsets between the transmitters of the network to be determined in order to solve the positioning equations. This can be done using location measurement units (LMUs) having additional receivers. LMUs are placed at known locations so that their OTDA measurements can be converted directly into a network timing model (see for example WO-A-00-73813).

Alternatively a technique (see WO-A-00-73814) may be used in which measurements of signals from a number of geographically disparate transmitters at known positions made, for example, by two geographically disparate terminals at unknown positions, may be used to compute both the positions of the terminals and all the timing offsets between the measured transmitters, without the need for LMUs.

A satellite positioning system, such as GPS, gives an accurate result provided that the receiver can receive sufficient satellite signals. The satellite signals are related to a common time-base of a globally defined standard time, e.g. GPS Time or Universal Coordinated Time, UTC. For example, within GPS, each satellite in the constellation has a stable atomic clock whose time is continuously measured and compared with a single reference clock located on the ground. The time of each satellite clock is steered towards alignment with the reference clock and a parametric model is derived which describes the difference in time between the two clocks. The parameters (three for GPS) are up-loaded to the satellite and broadcast by the satellite as the clock correction parameters. This has the effect, after making corrections based on the parameters, of aligning the satellite clock closely with the ground-based reference clock.

Satellite positioning systems work well in situations where the receiver's antenna has clear sight of the sky, but they work poorly, or not at all, inside buildings or when the view of the sky is obscured. The current invention provides a solution to this problem by using both satellite and network measurements to provide a robust location determining system. Reversionary modes are identified which use combinations of satellite and cellular positioning, either alone or in combination, by which a continuous location solution is available when either the satellite signals are obscured or there are insufficient terrestrial signals available.

The performance of a satellite positioning system (SPS) can be improved by supplying the satellite positioning receiver with assistance data. A requirement in the provision of assistance to satellite positioning receivers carried in mobile terminals is the communications overhead associated with the assistance data. The invention provides a means for significant reduction in the quantity of data which has to be transferred, releasing communications capacity for other uses.

The protection of the privacy of the user of a mobile terminal is considered of great importance. Consequently, the transmission of location information over a communications network can be sensitive. A feature of this invention is that neither the absolute location of the terminal, nor an approximation thereof, is transmitted over the data link.

A further benefit of the invention includes the use of cellular location to provide for the intermittent or continual pre-positioning of the satellite receiver code-phase search process whilst satellite signals are too attenuated to provide this function alone with adequate reliability. The provision of position aiding may benefit in ways other than improved accuracy, such as faster time to first fix, longer battery life or lower communications usage. A yet further benefit of the invention provides for the limitation of the search range for the received satellite code signal alignment in the satellite receiver. This allows the use of less-complex silicon chips for the satellite positioning system.

There is a requirement to determine the number of code intervals between the satellite and the receiver in the transient phase of a satellite positioning system location calculation between first measurements and stable solution. This is commonly known as the integer ambiguity problem. The positioning information derived from the cellular network in the present invention is used to determine uniquely the number of code intervals between each satellite and the receiver, thereby avoiding this problem.

PRIOR ART

Various proposals have been made to provide 'assistance' to aid in the acquisition of the weak satellite signals used in shielded environments (e.g. in dense urban canyons or inside buildings). For example, U.S. Pat. No. 5,663,735 discloses providing an additional radio signal to an additional receiver in a GPS terminal, the radio signal having a standard time or frequency and using the standard time or frequency to resolve a GPS time for a time of arrival of a data bit. In another example, (see WO-A-99-47943) a mobile cellular telephone network is adapted to receive GPS signals at a base transmitter station (BTS) to allow it to calculate the position of a mobile telephone.

In a further development (see US-2002-0168988; Younis) a GPS unit has a position determining entity (PDE) which includes a reference signal receiver, typically part of a mobile communications system, and part of a reference signal received by the reference signal receiver is transmitted to the PDE to provide additional timing data which can be used to assist the GPS unit operation. Timing assistance is provided to a GPS set in a mobile terminal by using a reference signal (for example a public broadcast signal) which is received both in the said mobile terminal and in one or more receivers in the network. The terminal sends a locally-timed snippet of the received reference signal to a network-based computing node, along with a request for GPS aiding information, where the time offset of the reference signal with respect to GPS time is determined. The aforesaid time offset is sent back to the mobile terminal which uses the information to acquire GPS signals. The current invention does not compute any GPS time offsets in the network, and neither does it transmit such information over a communications link. Furthermore, the current invention does not transmit snippets of reference signals over a communications link.

The sending of assistance data over a link has been known in the art for many years. One of the earliest examples was provided in 1986. The White Sands Missile Range Interface Control Document disclosed position reporting over a two-way communications link which allowed for the transfer of either pseudo-range or computed location based on a geodetic coordinate reference frame as defined, from time to time, in WGS84 format. ICD GPS 150, dated 1986 and issued by the US government to potential bidders for the range applications joint programme, incorporated, inter alia, support for mobile GPS receivers through transmission of ephemerides, almanac and time information. Actual use of these data formats in support of mobile GPS receivers by means of two-way data-links has been made since 1986.

Providing a satellite positioning system receiver with assistance data can enhance its performance. Furthermore, accurate timing assistance (with associated position assistance of sufficient accuracy) reduces the complexity of the associated chip sets. Assistance data may comprise all or some of three elements: a) satellite information, b) time aiding, and c) position aiding. The current application is concerned specifically with the provision of position information.

Known in the art are methods by which the satellite information is provided by a server which is linked to one or more SPS reference receivers that continually monitor the satellite signals in order to obtain the satellite information. In a GPS system, this information can also be obtained directly by the GPS receiver from the satellite signals whenever a satellite signal can be received. Time aiding may be obtained from network signals whose timings have previously been related to the satellite time base by network-based equipment. An estimate of a receiver's position may be obtained using a network positioning method, such as one based on OTDA. In all cases in the art, the assistance data is sent to the GPS receiver embedded in the mobile terminal using a two-way data channel provided by the mobile cellular network.

In our WO-A-00-73813 and WO-A-00-73814 (which are hereby incorporated by reference) we describe a communications system and method which constructs and maintains a timing model defining the timing relationships between transmitters in the cellular radio network, and which also computes the position of the receiver. The method makes use of relative time offsets of the signals received by several terminals from the transmitters of the network, from which both the transmit time offsets of the radiated signals and the positions of the several terminals are computed simultaneously.

Other references describing assistance systems include U.S. Pat. No. 6,429,815, US-2002-0075942, US-2002-0068997, US-2002-0123352, WO-A-02-091630 and WO-A-01-33302.

In U.S. Pat. No. 6,445,927 (King et al.) there is described a method for computing the location of a base-station in a communications network, using measurements made by a mobile terminal of the time of arrival of communication signals from the base station with respect to GPS position information obtained from a GPS set carried within the terminal. A critical feature is that the mobile terminal must be located in a minimum of three geographically disjoint locations before a solution can be found. The current invention is not concerned with determining the location of the base station because this information is provided within the method.

Soliman describes, in U.S. Pat. No. 6,166,685, a method by which the location of a mobile terminal may be tracked using positions obtained from a satellite positioning system enhanced with information received from the infrastructure of the communications system. An initial position is obtained from the satellite system, and is then updated using range measurements between the mobile terminal and two or more base stations of the network whenever the accuracy associated with the range measurements passes a threshold value. The current invention concerns the provision of position information to assist the satellite receiver to acquire satellite signals and is therefore not for the purpose of tracking the position of the terminal. Furthermore, it does not make or use range measurements, and does not require an accuracy threshold.

In summary, therefore, it is known that current systems for locating a mobile receiver using satellite positioning technology can be improved if they are supplied with assistance information which includes position information of sufficient accuracy. The current invention shows how this information can be supplied in a manner which (a) minimises the communications overhead associated with the supply of the information to the mobile terminal (and hence reduces the cost and complexity of the system), and (b) which enhances the security of the system. The position of the terminal is never sent over the radio link (the data channel) between the terminal and the network infrastructure, so that it is not possible to deduce the position of the terminal by intercepting any of the messages associated with the invention.

SUMMARY OF THE INVENTION

According to a first aspect of the invention there is provided a method of supplying position assistance information to a receiver of a satellite positioning system, contained within a mobile terminal having a timing reference, said mobile terminal being connected to a cellular communications network and also able to communicate via a bi-directional link with one or more remote devices capable of calculating position information, the method comprising the steps of:

(a) at a first location, where satellite signals are available, obtaining satellite position information of the mobile terminal from the satellite positioning system, storing said satellite position information within said terminal, measuring first time offsets, of the signals received by the terminal from a first plurality of transmitters of said cellular communications network, relative to each other or to the timing reference;

(b) sending said first time offset measurements to a remote device, calculating first terminal cellular position information in the remote device using said time offset measurements, and storing said first terminal cellular position information;

(c) at a second location, where signals from the satellite positioning system are not adequately available, measuring second time offsets, of the signals received by the terminal from the first or a second plurality of the transmitters of said cellular communications network, relative to each other or to the timing reference;

(d) sending said second time offset measurements to, and calculating second terminal cellular position information in, the or another remote device;

(e) retrieving the first terminal cellular position information and calculating a cellular position difference vector from the first and second terminal cellular position information, and sending the cellular position difference vector to the mobile terminal;

(f) adding said cellular position difference vector to the satellite position information stored within the mobile terminal and obtaining therefrom position assistance information of the mobile terminal at the second location; and (g) providing said position assistance information to the satellite receiver within the mobile terminal to aid the acquisition of satellite signals by the satellite receiver.

The invention also includes a system for supplying position assistance information to a satellite positioning system receiver adapted to obtain, where possible, satellite position information of the mobile terminal from a satellite positioning system, the satellite positioning system receiver being contained within a mobile terminal, and said system including a mobile terminal having
   a timing reference,
   a receiver for connection to a cellular communications network,
   means for communicating via a bidirectional link with one or more remote devices,
   storage means for storing said satellite position information within said terminal,
   means for measuring first and second time offsets of the signals received by the terminal from one or more pluralities of transmitters of said cellular communications network, relative to each other or to the timing reference,
   at respective first and second locations of said terminal, and means for sending said first and second time offset measurements to a remote calculation device;
a remote calculation device for calculating terminal cellular position information using said time offset measurements;
a storage device for storing terminal cellular position information;
means for retrieving terminal cellular position information from the storage device and calculating a cellular position difference vector from the first and second terminal cellular position information; and
means for sending the cellular position difference vector to the mobile terminal;
the terminal further including
   means for adding said cellular position difference vector to the satellite position information stored within the mobile terminal and obtaining therefrom position assistance information of the mobile terminal at the second location, and
   means for transferring said position assistance information to the satellite receiver within the mobile terminal to aid the acquisition of satellite signals by the satellite receiver.

The first and second time offset measurements may be sent by the means in the terminal to the same remote calculation device or to different remote calculation devices. For example, the two locations may lie in areas served by different calculation nodes of a positioning system, so that it might be convenient to send the time offset measurements measured at the first location to one calculation node, and those measured at the second location to another. The number of physical devices used makes no difference to the essence of the invention, which is independent of where the calculations are made. Indeed, in a networked system in which many nodes are joined together and in communication with each other, the physical location of the source of information supplied in response to a request is irrelevant and often unknown. Each node has a unique logical address assigned to it, and this determines which is used to supply the information. The same considerations apply to the storage devices. The essence of the invention does not depend on how many storage nodes are used, nor on where they are, nor on their construction. One or more storage device may be attached to or remote from the calculation device or devices.

The first and second time offsets of the signals received by the terminal may be time offsets from the same plurality of transmitters of the cellular communications network or from different pluralities of transmitters, depending on the extent to which the terminal has moved between the times at which the signals are received from the communications network and hence depending on the transmitters from which the terminal can acquire such signals. In the system described in WO-A-00-73813 and WO-A-00-73814, a timing model of the cellular network is maintained by a background stream of timing offset measurements made by terminals all over the network. The model can include entries for all of the transmitters in the network. Therefore, the plurality of transmitters measured by the terminal at the first location can be identical with, overlap partially with, or be completely different from, the plurality of transmitters measured by the terminal at the second location. This makes no difference as the timing relationship between any two transmitters is defined within the model.

As an alternative to sending a position difference vector, an average velocity or acceleration vector can be used.

Thus, according to a second aspect of the invention there is provided a method of supplying position assistance information to a receiver of a satellite positioning system, contained within a mobile terminal having a timing reference, said mobile terminal being connected to a cellular communications network and also able to communicate via a bi-directional link with one or more remote devices capable of calculating position information, the method comprising the steps of:

(a) at a first location, where satellite signals are available, obtaining satellite position information of the mobile terminal from the satellite positioning system, storing said satellite position information within said terminal, measuring first time offsets, of the signals received by the terminal from a first plurality of transmitters of said cellular communications network, relative to each other or to the timing reference;

(b) sending said first time offset measurements to a remote device, calculating a first terminal cellular position information in the remote device using said time offset measurements, and storing said first terminal cellular position information;

(c) assigning a first time-tag to the first time offset measurements and storing said first time-tag;

(d) at a second location, where signals from the satellite positioning system are not adequately available, measuring second time offsets, of the signals received by the terminal from the first or a second plurality of the transmitters of said cellular communications network, relative to each other or to the timing reference;

(e) sending said second time offset measurements to, and calculating a second terminal cellular position information in, the or another remote device using said second time offset measurements;

(f) assigning a second time-tag to the second time offset measurements and storing said second time-tag;

(g) retrieving the first terminal cellular position information and the first time-tag and calculating a cellular average motion vector from the first and second terminal cellular position information and the first and second time-tags, and sending the cellular average motion vector to the mobile terminal;

(h) calculating in the terminal a position difference vector using said cellular average motion vector and the first and second time-tags, and adding said cellular position difference vector to the satellite position information stored within the mobile terminal and obtaining therefrom position assistance information of the mobile terminal at the second location;

(i) providing said position assistance information to the satellite receiver within the mobile terminal to aid the acquisition of satellite signals by the satellite receiver.

The motion vector is the average velocity or the average acceleration vector derived from the cellular measurements, with the average being taken over the time interval between the first and second time tags. A time-tag can be sent in either direction depending on where it is generated, and may be stored in the terminal or in one or more remote devices, or both, as convenient for the implementation of the invention.

According to the second aspect of the invention, there is also provided a system for supplying position assistance information to a satellite positioning system receiver adapted to obtain, where possible, satellite position information of the mobile terminal from a satellite positioning system, the satellite positioning system receiver being contained within a mobile terminal, and said system including a mobile terminal having
  a timing reference
  a receiver for connection to a cellular communications network,
  means for communicating via a bidirectional link with one or more remote devices,
  means for measuring first and second time offsets of the signals received by the terminal from one or more pluralities of transmitters of said cellular communications network, relative to each other or to the timing reference,
  at respective first and second locations of said terminal,
  storage means for storing said satellite position information, and
  means for sending said first and second time offset measurements to a remote device;
means for assigning first and second time-tags to the time offset measurements;
storage means for storing the first and/or second time-tags; and
a device for retrieving the first terminal cellular position information and the first time-tag, calculating a cellular average motion vector from the first and second terminal cellular position information and the first and second time-tags, and
means for sending the cellular average motion vector to the mobile terminal,
the mobile terminal further including
  calculation means for calculating a position difference vector using said cellular average motion vector and the first and second time-tags, and
  adding said cellular position difference vector to the satellite position information stored within the mobile terminal to obtain therefrom position assistance information of the mobile terminal at the second location; and
  means for transferring said position assistance information to the satellite receiver within the mobile terminal to aid the acquisition of satellite signals by the satellite receiver.

The invention therefore enables the transfer of calibrated position information within a terminal as the terminal moves from one position to another, for aiding a satellite-based position determining system. Only a position difference vector or motion vector is transferred from the remote device to the terminal, so that the absolute position of the terminal can only be calculated within the terminal itself by combining the cellular position difference vector or motion vector with the initial satellite position. This has two advantages. The first is that the amount of data needing to be transferred over the link is minimised. For example, to send an absolute 2D position accurate to 100 m using, say, WGS 84 coordinates would require about 40 bits of information. To send a position difference corresponding, say, to 100 km of travel would require just 12 bits. The second advantage is that the absolute position of the mobile terminal cannot be deduced by intercepting the position messages sent from the network to the terminal. The vector is useless without knowledge of its origin. This enhances the security of a system constructed according to the invention.

The satellite positioning system may be any positioning system which uses Earth-orbiting satellites for positioning services. Such systems include the Global Positioning System (GPS), Galileo, Beidou, Compass, QZSS, and Glonass.

The invention also applies equally and without limitation to all communications systems such as GSM, CDMA, W-CDMA, TDMA, TDS-CDMA, PDC, and IDen.

The bidirectional link between the mobile terminal and the network can be realised by any convenient means, but preferably uses one or more channels of the communications network.

The remote device or devices may be one or more calculation nodes connected to the network, for example a software program running on one or more computers which is or are able to receive messages from the mobile terminal, and which can send messages back again. The connection between the network and the calculation node or nodes may be direct, via another cellular communications network, or via a system using fixed infrastructure such as the internet. The remote devices may also be storage nodes, such as computer memory or other machine-accessible media. They may be part of the calculation node or nodes, or may be remote from it or them, but able to communicate with the calculation node or nodes via one or more bidirectional links. In a particular implementation all the remote devices may be parts of the same physical device.

The timing reference may be a signal received by a receiver, or another signal which may be locally generated, for example by a quartz oscillator. The signals received by the terminal from a serving transmitter of the communications network may be used as a reference, and the timings of the signals received from other transmitters measured with respect to it. Alternatively, an internal clock of adequate stability over a short period may be used as a reference.

The first and second time-tags include estimates of the instants at which the first and second time offsets respectively are made of the signals received by the terminal from transmitters of the communications network. These measurements are made within the terminal, but there are three options for the assignment of the time-tags.

In the first option the time-tags are assigned using a local timing reference within the mobile terminal and these are sent to the remote device.

In the second option the time-tags are assigned in the remote device on receipt of a message from the mobile terminal. In this case, the time-tags require corrections for the data-link latency time, which in a store-and-forward packet system (e.g. the Short Message Service in GSM) can be many seconds. The data-link latency time comprises (a) the time of flight of the signals between the mobile terminal and a remote device, and (b) the cumulative delays caused by the processing of the messages at the various network components (e.g. in data stacks).

In the third option, the structure of the signals themselves received by the terminal from the transmitters of the network is used to assign the time-tags. For example, in GSM the signals are divided into numbered frames of equal length. The transition from one frame to the next in the signals from a particular transmitter in effect provide the tick of a regular clock within that transmitter. Furthermore, the frames each contain a precise number of data bits (1250 in GSM) which subdivide the intervals between the ticks. A transition between one frame and the next, indicated by the change of the frame number, plus the number of data bits following the transition up to the moment of the OTDA measurement constitute the estimate of the instant within a time-tag (frame number plus fraction thereof) of sufficient accuracy for the purpose of the invention. As explained in our WO 00/73813 and WO 00/73814, the calculation of a cellular position also results in a precise model of the transmitter time offsets of the (unsynchronised) network signals, and these are also expressed as relative frame-number offsets and fractions thereof. The model of transmitter time offsets can be extended to a large family using the techniques in our WO 00/73813 and WO 00/73814. Mobile terminals, which move within the extended network, provide measurements of relative transmitter time offsets and communicate such measurements to the network infrastructure. Hence remote devices have available to them a map of the frame numbers and fractional frame numbers of each of the transmitters relative to every other within the extended network. The instant within the first time-tag expressed as a frame number and fraction of a frame number of the signals from transmitter A may be related precisely to the instant within the second time-tag expressed as a frame number and fraction of a frame number of the signals from transmitter B. Since the calculated cellular positions of the terminal are also known in each case, a correction is applied to account for the times of flight of the signals from the respective transmitter to the mobile terminal.

In either of the second or third options, the time tags corrected or assigned by a remote device are sent to the mobile terminal.

The steps of measuring the time offsets of the signals received from the transmitters may be achieved using signal patterns in each of the signals transmitted by the respective transmission source. As explained in our WO 00/73813 and WO 00/73814, in the case when the transmission sources are members of a communications network, for example a GSM or WCDMA network, the signal patterns may be synchronisation bursts broadcast on a control channel, or they may be frame boundaries in the transmitted data streams.

In order to improve the cellular position difference vector, improvements in the accuracy of the individually calculated cellular positions can be made. The accuracy with which a cellular position is determined is dependent upon a number of factors including the local radio propagation environment. Normally, there are several different paths between a transmitter and the mobile terminal. At the mobile terminal, the amplitudes and phases of the signals along each of these paths are combined as vectors. Consequently, within the locale of a mobile terminal location, the effective time of flight between a transmitter and the terminal varies markedly for small changes in the terminal's position. The accuracy with which the OTDA measurements are made can be improved by a process of combining a plurality of such measurements. Processes of combining such data are well known and may, for example, include averaging the OTDA measurements, or using each set of OTDA measurements to calculate a position and then averaging the calculated positions.

In a further aspect, the combining operation is associated with a dynamic model of the motion of the mobile terminal to provide improved OTDA estimates. The dynamic model is used as a predictor of the motion of the terminal, and the OTDA measurements are combined together taking account of the predicted motion. Such methods are also well known, and may for example include the use of tracking filters, Kalman filters and the like. It is also possible to use separate filters on the time series of OTDA measurements from individual transmitters, with corresponding dynamic modelling, to obtain better estimates of the OTDA values before calculating a position.

An alternative to combining the OTDA measurements themselves is to combine the cellular positions calculated from each set of OTDA measurements separately. This is further enhanced by associating the cellular positions with a dynamic model of the motion of the mobile terminal.

The process of combining measurements either of the transmission time offsets or cellular location is, in a preferred embodiment, performed initially at a location where positions measured by a satellite positioning system, SPS, are simultaneously available. A dynamic model derived from such SPS measurements may include some or all of position information, velocity, acceleration, and measures of accuracy associated with each information state (such as standard deviation or variance). Such accuracy information may be further sub-divided into elements associated with measurement and process noise, such as may characterise an adaptive location filter. The information state error variances normally grow with time after measurements (from the SPS system) become unavailable. The position information state determined in this way is used to characterise the motion of the terminal. By combining the SPS position information and its dynamic model with the position information from the cellular measurements, the cellular position information determined from measurements made by the terminal within the locale of the said first location is improved.

The first and second aspects of the invention may therefore include additional steps as follows:

Within the locale of the first location, obtaining multiple measurement information sets including measurements of the time offsets of the signals received by the terminal from a plurality of the transmitters, assigning a time-tag to each measurement information set, obtaining motion information including a dynamical model of the motion of the terminal from the SPS measurements, removing the effects of the predicted motion from said measurement information sets using said motion information, and combining the corrected measurement information sets.

In an alternative embodiment, and within the locale of the first location, obtaining multiple measurement information sets, including measurements of the time offsets of the signals received by the terminal from a plurality of the transmitters, from each of which measurement information set cellular position information is determined, assigning a time-tag to each of the measurement information sets, obtaining motion information including a dynamical model of the motion of the terminal from the SPS measurements, removing the effects of the predicted motion from said cellular position informations using said dynamical model, and combining the corrected cellular position informations to form an improved cellular position information.

In another embodiment of the invention, and within the locale of the first location, the cellular position informations are further combined with the motion information to obtain coherency indicator information which pertains to the degree of independence of the cellular measurement information sets from each other with respect to time or position, and using said coherency indicator information at the second location, to determine the extent of plural cellular measurement information sets used in the combining operation.

The accuracy of the of the position difference vector, or of the average velocity vector, or of the average acceleration vector, is therefore improved by combining a plurality of measurements taken at different positions within the locale of the first and second locations.

The second location may be any location, but in particular may be a location at which the satellite signals are not adequately available, i.e. they are not sufficient to enable a position solution to be found. This may be because the satellite receiver's antenna does not have a clear view of the sky, as discussed above, or where the satellite signals are attenuated such that the receiver needs assistance in order for it to acquire satellite signals, again as discussed above. In this case, the position information calculated according to the invention may be supplied to the satellite receiver which may use it, for example, (a) to pre-position the code-phase search engines to minimise the search range required, and/or (b) to pre-position the dynamic filters for first satellite range measurements, thereby removing the requirement to resolve the ambiguity in the pseudorange measurements by other means mentioned above. Such a method can be used to reduce the time required to compute the position of the terminal in the satellite positioning system.

The invention also includes a method of determining the position of a mobile terminal of a satellite positioning system in which the satellite receiver is provided with calibrated terminal position information in accordance with the invention, and the position of the terminal is determined using at least one of the satellite signals.

The position may be determined using just the satellite signal measurements or it may be improved by combining the satellite and network signal measurements.

In the event that a position using the satellite system cannot be computed, even with assistance, the invention is still able to provide a position based on the terrestrial network timing measurements and the initial satellite position. This provides a reversionary mode which avoids complete location failure in comparison with unassisted satellite positioning.

The invention also includes a medium carrying a set of instructions which, when loaded into a terminal containing satellite positioning system components, enables the terminal to carry out the method of the invention.

The invention also includes a mobile terminal of a satellite positioning system as defined above in relation to the systems of the first and second aspects of the invention.

BRIEF DESCRIPTION OF THE DRAWINGS

The invention and examples of the system in which it may be deployed will now be further described with reference to the accompanying drawings, in which.

DETAILED DESCRIPTION OF THE EXAMPLES

Figure 1:
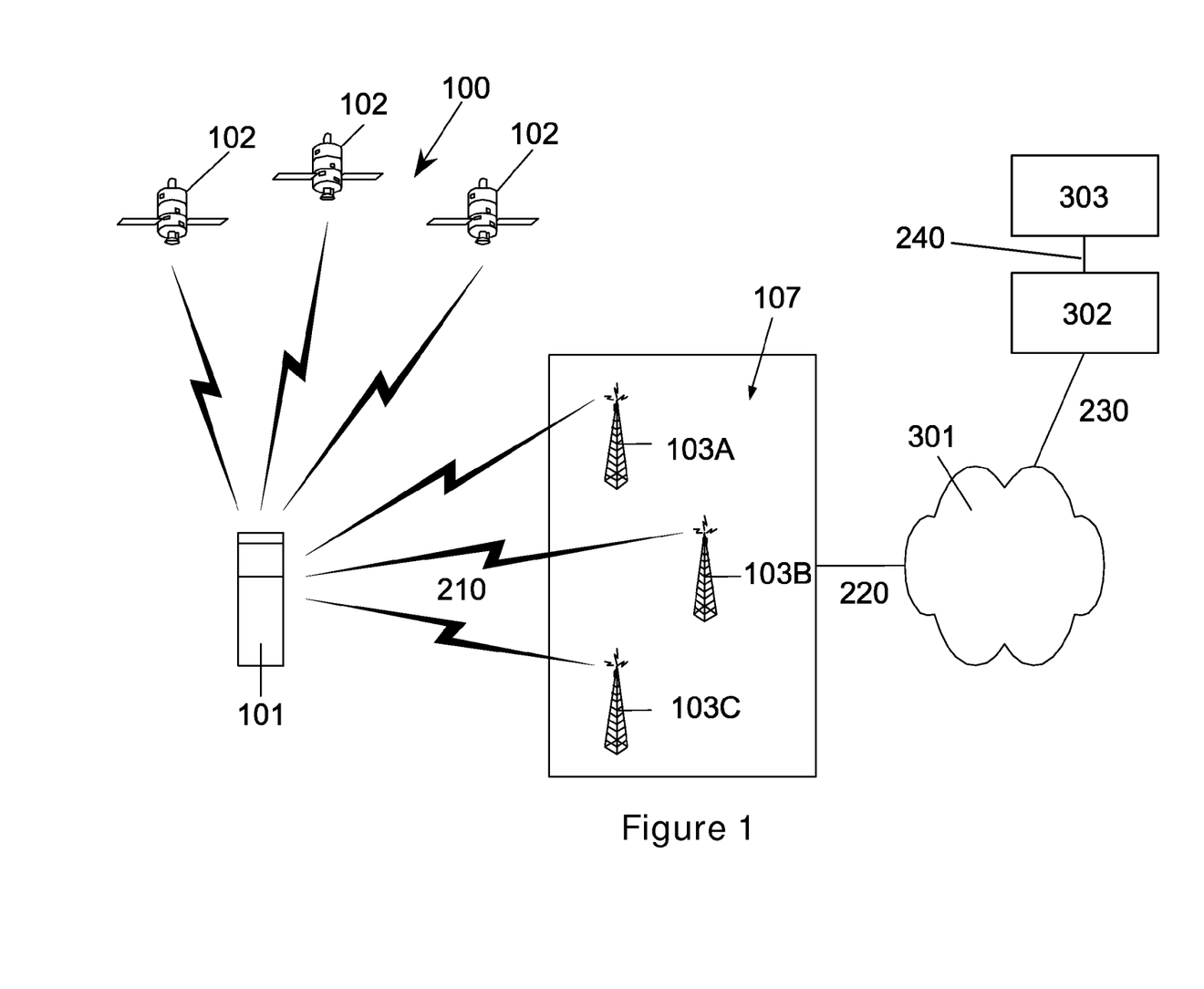
FIG. 1 is a diagram illustrating the overall architecture of a satellite positioning system in which the invention is deployed.

FIG. 1 shows an example of a system embodying the invention and, in particular, shows the overall architecture of a satellite positioning system. A terminal 101 receives the signals broadcast from satellites 102 of the satellite system 100, in this case a GPS constellation. It also receives the signals broadcast by the base transceiver stations (BTSs) 103A-C of a terrestrial network 107, in this case a GSM network.

Referring to FIG. 1, signals from transmitters 103A to 103C of network 107 are received by terminal 101 and the times of arrival of particular signatures in the signals are measured with respect to the terminal's clock. Such signatures can include, for example in GSM, the sync patterns transmitted periodically on BCCH. If $t_{A1}$ is the time of receipt of the signature in the signal from transmitter 103A when the terminal is at location 1, then $t_{A1}$ is given by $$vt_{A1} = r_{A1} + v\alpha_A + v\epsilon_1, \quad (1)$$

where $\alpha_A$ is the transmission time offset of transmitter A and $\epsilon_1$ is the time offset of the terminal's clock when at location 1, all times expressed with respect to a universal clock, $r_{A1}$ is the distance between the terminal and the transmitter, and v is the speed of the radio waves in the medium in which the transmission takes place. Such measurements are also made on the signals received from transmitters 103B, 103C, etc., and the whole set is sent from terminal 101 to a remote device 302 forming a calculation node connected to the network 107. It should be noted that the interval over which the measurements are made is very short, so that any deviation from uniform time-keeping of any time reference is negligible. A time-tag containing the time $\tau_1$ at which the measurements are made is also recorded in the terminal 101 and sent to the remote device 302.

The GPS positioning receiver 201 (see FIG. 2) makes an estimate of the 'absolute' position of the terminal, e.g. expressed in global coordinates such as WGS 84, at a first location (location 1) using the signals from the GPS constellation. Typically, the signals from four satellites 102 are needed to obtain a 3D position-and-time fix, but more are used if available to improve the accuracy. The terminal's position $s_1$ thus obtained is stored in the terminal 101.

The calculation node 302 carries out a calculation, as explained in our applications WO-A-00-73813 and WO-A-00-73814, which produces both the cellular position of the terminal $x_1$ and the transmission time offsets $\alpha_A$, $\alpha_B$, $\alpha_C$ etc., corresponding to the transmitters 103. The values of $x_1$, $\alpha_A$, $\alpha_B$, $\alpha_C$ etc., and $\tau_1$ are all sent to and stored in a storage node 303 connected to the calculation node 302.

The terminal now moves to a second location (location 2) at which it cannot receive adequate satellite signals, but where it can receive the signals from the GSM network transmitters 103. The terminal 101 makes measurements of the signals received from all of the network transmitters and the whole set is sent from the terminal 101 to the calculation node 302, together with a second time-tag containing the time $\tau_2$ at which the measurements are made. As explained above, the calculation node 302 carries out a calculation which produces values for the transmission time offsets and the cellular position of the terminal $x_2$ at the second location.

The calculation node 302 recalls the set of information stored in the storage node 303, and calculates one or more of the cellular position difference vector $\Delta x$, the average cellular velocity vector $u$, and the average cellular acceleration vector $a$, as follows:

$$\Delta x = x_2 - x_1,$$

$$u = (x_2 - x_1)/(\tau_2 - \tau_1), \text{ and}$$

$$a = 2(x_2 - x_1)/(\tau_2 - \tau_1)^2. \quad (2)$$

One or more of these calculated values is sent to the terminal 101 which is then able to estimate the position $\hat{s}_2$ of the terminal at location 2 using the following:

$$\hat{s}_2 = s_1 \Delta x,$$

$$\hat{s}_2 = s_1 + u(\tau_2 - \tau_1),$$

$$\hat{s}_2 = s_1 + a(\tau_2 - \tau_1)^2/2. \quad (3)$$

The calculated value of $\hat{s}_2$ is then provided to the GPS receiver 201 as assistance information. The position assistance aids in the acquisition of satellite signals for example (a) by pre-positioning the code-phase search engines to minimise the search range required, and/or (b) by pre-positioning the dynamic filters for first satellite range measurements, thereby removing the requirement to resolve the ambiguity in the pseudorange measurements by other means. Hence the calculated cellular position $\hat{s}_2$ of the second location assists the GPS receiver to acquire sufficient satellite signals for it to obtain a satellite position for location 2.

One of the assumptions underlying the method of the invention outlined above is that the relative transmission time offsets of the network transmitters 103 do not change between the measurements made at location 1 and those made at location 2. Our applications WO-A-00-73813 and WO-A-00-73814 disclose how allowances may be made for slow changes in the transmission time offsets. Such slow changes are often caused by slight differences in the clock rates for each transmitter and may be sufficiently parametrically characterised by the relative transmission time offsets and the rate of change of the said transmission time offsets.

Figure 2:
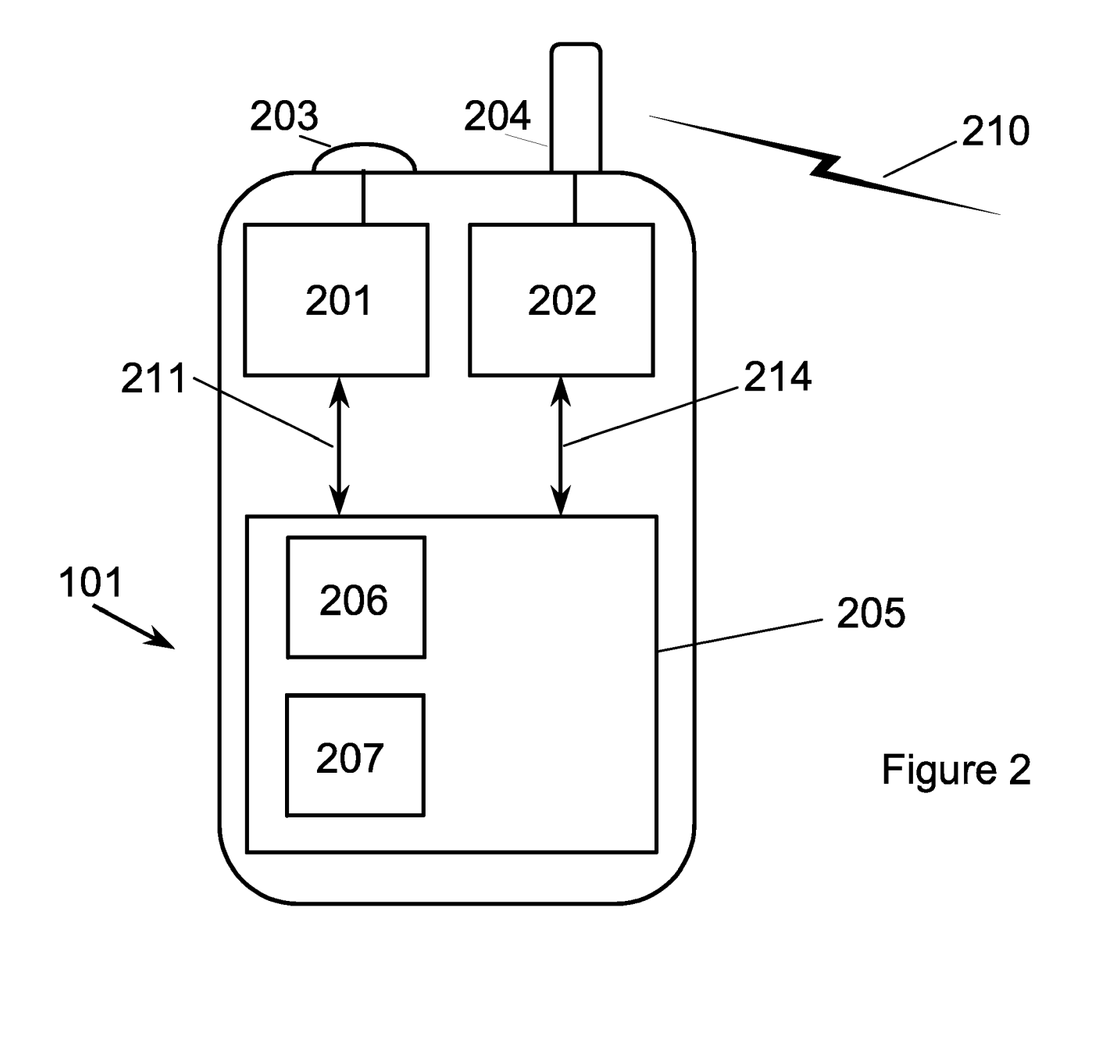
FIG. 2 is a diagram illustrating the main functional components of, and the signalling and data flows in, a mobile terminal for use in a system of the invention.

FIG. 2 shows the main functional components of the mobile terminal 101 used in the system shown in FIG. 1. The terminal 101 includes a GPS receiver 201 containing a receiver for receiving signals from satellites of the GPS constellation 100 via patch antenna 203, a GSM module 202 containing a receiver for receiving the signals from the GSM radio network 107 via antenna 204, a general-purpose processor 205 including the memory, processing circuitry, and software program (not shown) usually associated with such a device within a mobile terminal, an oscillator circuit 206 which provides the timing reference for the terminal 101, and a software program 207 running on the general purpose processor 205.

The GSM module 202 also includes an interface (not shown in FIG. 2) which has the capability to input and output information to and from the terminal 101, and a signal processor (not shown), both of which are standard features of any GSM terminal and which provide the functionality to make network measurements such as observed time difference of arrival (OTDA), received signal strengths, transmitter identification, and other timing measurements of the signals received from the transmitters 103 by the GSM module 202, as described in WO-A-99/21028, the details of which are hereby incorporated by reference. Data is passed between the terminal 201 and the network 107 via a link 210, provided as part of the normal GSM function, for example using the Short Message Service (SMS).

The GPS receiver 201 within the terminal 101 of FIG. 2 receives and measures signals from the satellites 102 of the GPS constellation 100. It uses timing measurements of the signals from the satellite constellation 100 to compute the position of the terminal 101 as described.

FIG. 2 also shows further signalling and data flows within the terminal 101. Oscillator circuit 206 provides the timing reference for GSM module 202. The signal of the serving cell of the GSM network 107 received by module 202 is used to adjust the oscillator's frequency so that it conforms with the received GSM signal, i.e. a signal generated from the adjusted oscillator signal matches that of the received GSM signal. A bi-directional link 214 provides clock signals generated from the oscillator 206 to the GSM module 202, and values of OTDA and other measurements made by the GSM module 202 to the general purpose processor 205. Data to be transmitted by the GSM module 202 to the GSM network 107 are passed from the general purpose processor 205 via the same link 214. A bidirectional link 211 passes assistance information from the general purpose processor 205 to the GPS receiver 201, and GPS position information from the GPS receiver 201 to the general purpose processor 205.

FIG. 1 also shows the connectivity between the terminal 101 and the external devices 302 and 303. Messages from terminal 101 are sent via the radio link 210 to the communications network 107. This in turn is connected to the calculation node 302 via infrastructure link 220, the internet 301, and infrastructure link 230. The storage node 303 is connected to the calculation node 302 via link 240. In one embodiment, the two nodes are parts of the same computer, and in another embodiment they are different devices. In yet another embodiment, further computing and storage nodes are used (not shown in FIG. 3) connected via further links (not shown) to each other and to the internet 301 in similar fashions as for nodes 302 and 303.

Figure 3:
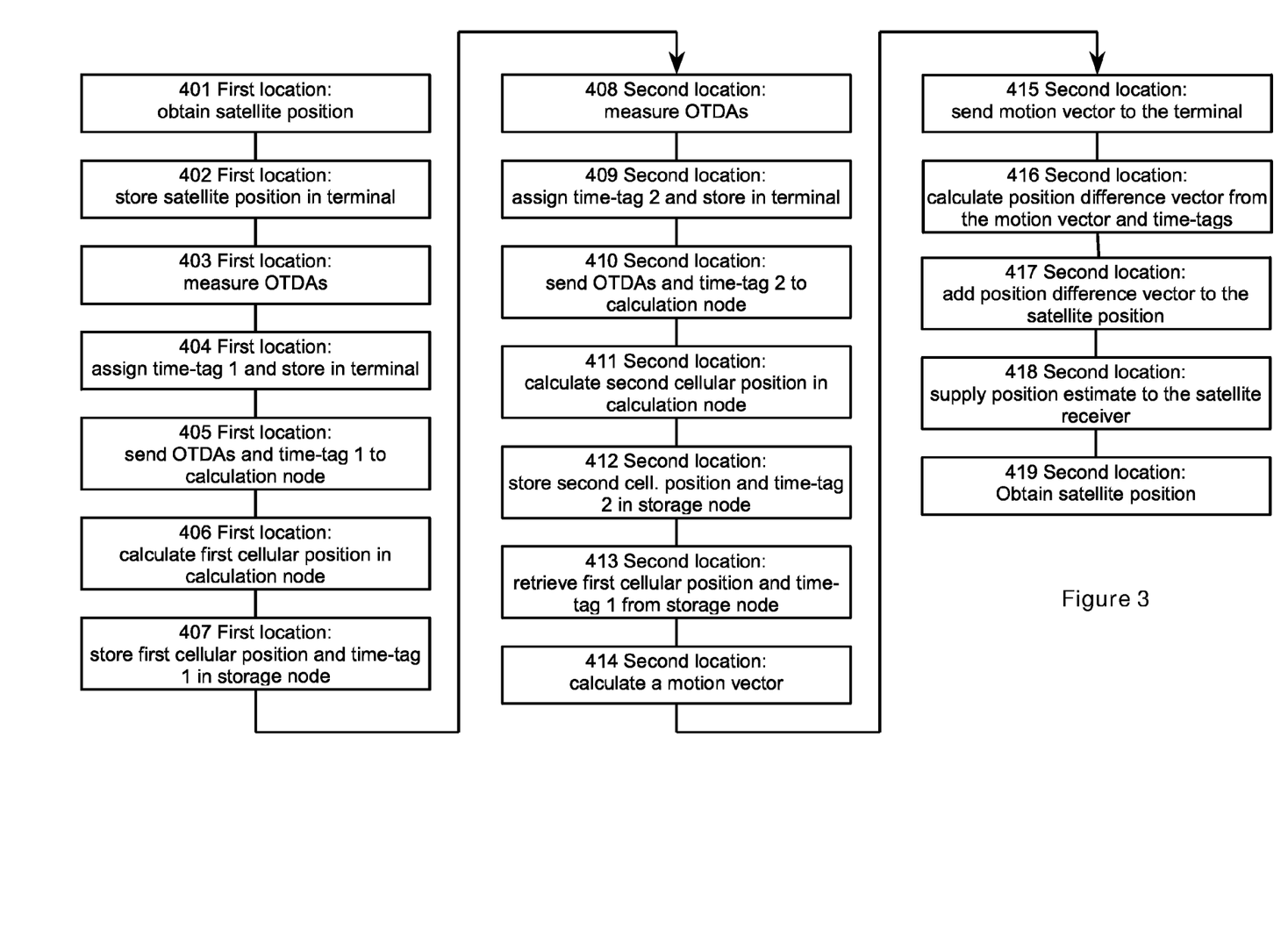
FIG. 3 is a flow chart showing the process used for computing positions in the system of FIG. 1.

A flow chart of the operation of the system of FIG. 1 is illustrated in FIG. 3.

Some time after the terminal 101 is turned on a GPS position $s_1$ is obtained in step 401 by GPS receiver 201 at the first location (location 1). This position is stored, step 402, in the terminal's memory. At the same time, in step 403, the GSM module 202 measures the relative observed times of arrival (OTDA) of the signals from all the network transmitters that it can detect—typically about 8. In one embodiment, the OTDAs are measured with respect to a clock signal derived from the oscillator 206. In another embodiment, the OTDAs are measured with respect to the OTDA of the serving GSM transmitter. The instant at which these measurements are made is assigned in a time-tag, step 404, measured using the clock signal derived from the oscillator 206. The time-tag is stored in the terminal's memory. The step of assigning and storing a time-tag is needed only in the cases in which average cellular velocity vectors or average cellular acceleration vectors are used. Therefore, in another embodiment which uses only position difference vectors, this step 404 is omitted. The measured OTDAs (and time-tag if used) are sent to the calculation node 302 in step 405 via links 210, 220 and 230.

The OTDAs received by the calculation node 302 are used in step 406 to calculate a cellular position of location 1 using the methods described in WO-A-00-73813 and WO-A-00-73814. This calculated position and time-tag (if present) are stored, step 407, in the storage node 303. As mentioned above, in one embodiment of the invention the nodes 302 and 303 are contained within a single computer, the calculation node being a software program running on the computer and the storage node being the computer's memory. In another embodiment, the two nodes are in separate computers linked via a TCP/IP network.

Some time after the events of steps 401-407, the terminal 101 moves into an environment (the second location) in which it is desired to obtain a satellite position for the terminal but where the signals from the satellites are attenuated such that the GPS receiver 201 needs assistance in order for it to acquire satellite signals. A second set of OTDA measurements is made in step 408. In embodiments using time-tags, the instant of making these measurements is assigned in a time-tag (step 409) and this is stored in the terminal's memory. The set of measured OTDAs (and the time-tag if used) is sent in step 410 to the calculation node 302, or to another calculation node (not shown) if the calculation node 302 is inaccessible for whatever reason. The cellular position of the second location is computed in step 411. In some embodiments, this is stored together with the time-tag (if present) in the storage node 303 (or another, not shown) in step 412. However, if step 412 is not needed it may be omitted.

The calculation node (e.g. 302) now has enough information to calculate a cellular position difference vector, a cellular average velocity vector, or a cellular average acceleration vector according to Equations 2. The first cellular position and first time-tag (if present) are retrieved from storage in step 413 and used together with the second cellular position and time-tag (if present) computed in step 411 to calculate either a position difference vector (no time-tags), or an average velocity or acceleration vector (using time tags). This "motion" vector is sent in step 415 to the mobile terminal 101. If the motion vector is already a position difference vector, the step 416 of calculating the position difference vector is a null operation. If the motion vector is an average velocity or acceleration vector, then the two time tags stored in the terminal's memory in steps 404 and 409 are retrieved and used with the motion vector to calculate the position difference vector.

The terminal 101 is now able to calculate the approximate position of the terminal, step 417, using its general purpose processor 205. The GPS position found in step 401 is retrieved from the terminal's memory and added to the position difference vector calculated in step 416. This gives the value of $\hat{s}_2$ (Equations 3) which in step 418 is provided to the GPS receiver 201 as an element of the assistance information. The GPS receiver 201 is then able to acquire satellite signals and calculate a GPS position of the terminal at the second location (step 419).

Figure 4:
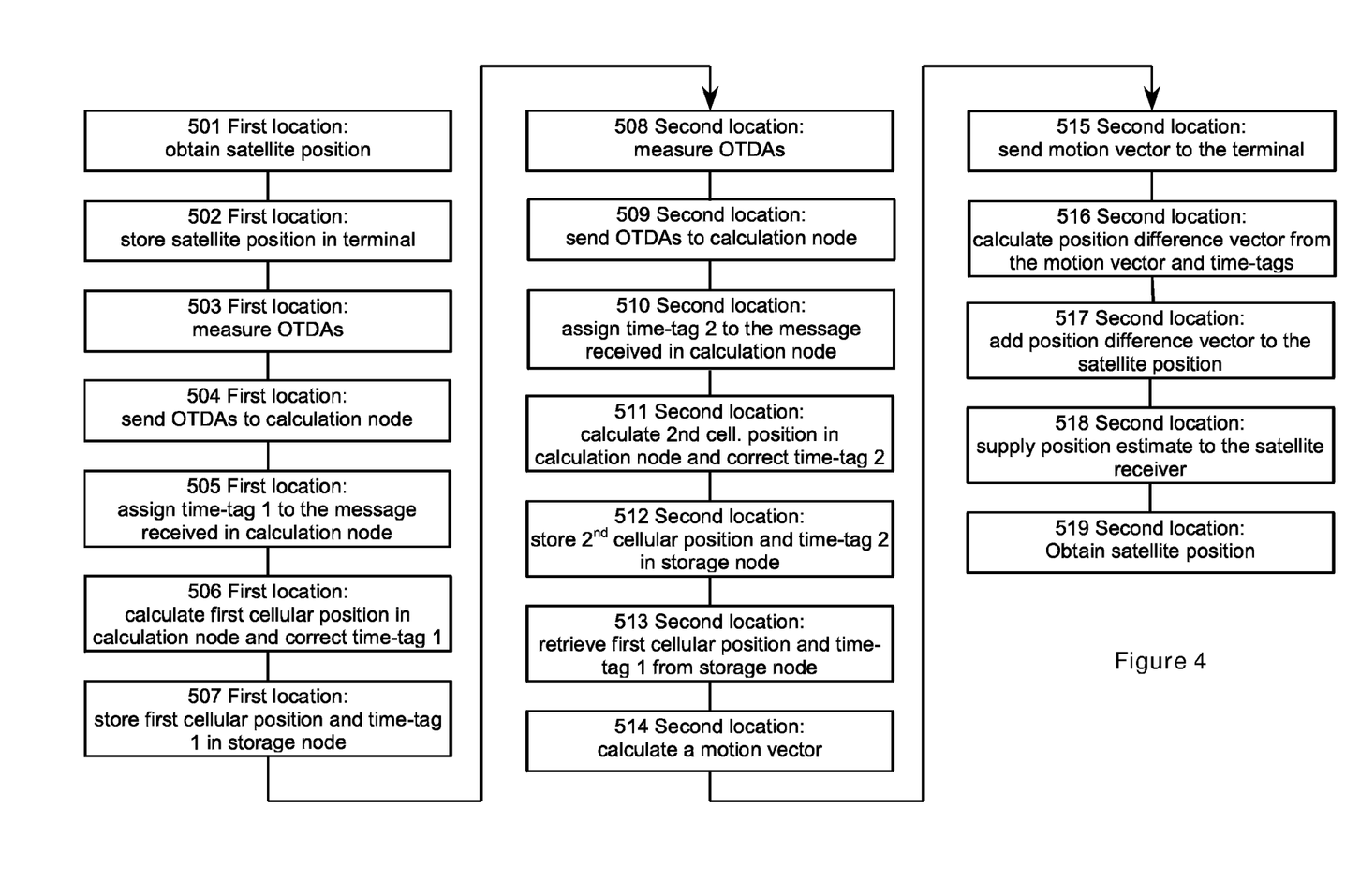
FIG. 4 is a flow chart for an alternative embodiment of the system of FIG. 1.

In some embodiments of the invention, the time-tags are assigned in the calculation node 302. The flow chart of operation is then slightly altered as shown in FIG. 4. In these embodiments, the time-tags are assigned on receipt of the messages from the terminal 101 by the calculation node or nodes in steps 505 and 510. They are measured with respect to a clock in the calculation node or nodes, or are derived from the framing structure of the signals as described above. The time-tags are corrected for times of flight and latency (as described above) in steps 506 and 511.

In some systems, plural measurements are made of the cellular signals within the locales of the first and second locations. These measurements are combined using one of the methods described above to reduce the errors associated with the cellular positions calculated for each of the two locations. The steps 403, 408, 503 and 508 are repeated and the measurements for each location are either combined within the mobile terminal 101 and the combination sent to the corresponding calculation node, or the measurements are sent separately and the combining is carried out in the calculation node.

Figure 5:
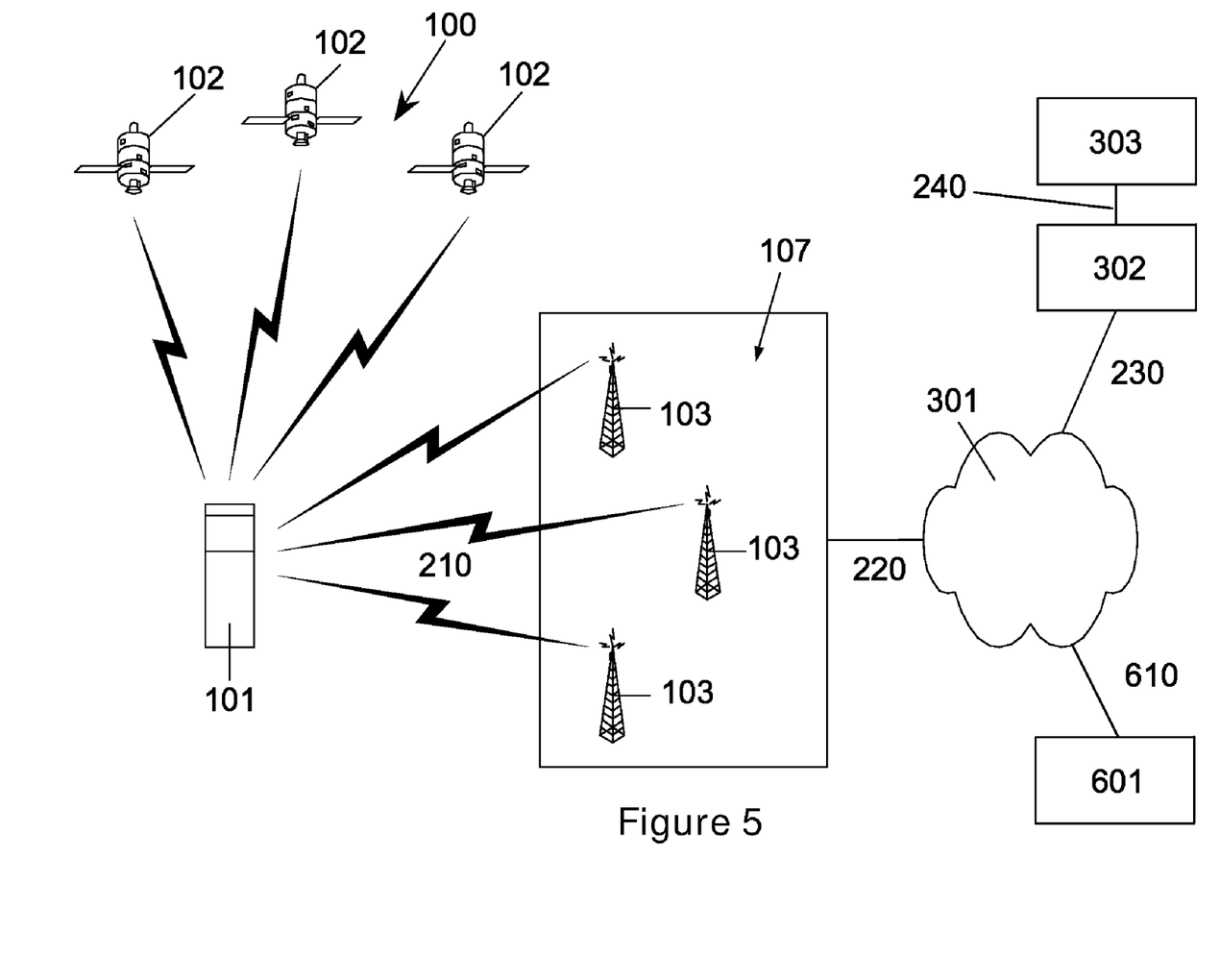
FIG. 5 is a diagram illustrating an alternative architecture in which the terminal communicates with a network application for exchanging position information.

Further embodiments of systems of the invention include positioning systems in which the mobile terminal 101 communicates with a server connected to the communications network as shown in FIG. 5. In operation, an application resident on the server 601 requests the position of the terminal 101 which computes its position in the same way as described in the preceding examples. The resulting position is returned to the requesting application using the communication links 210, 220, and 610.

Figure 6:
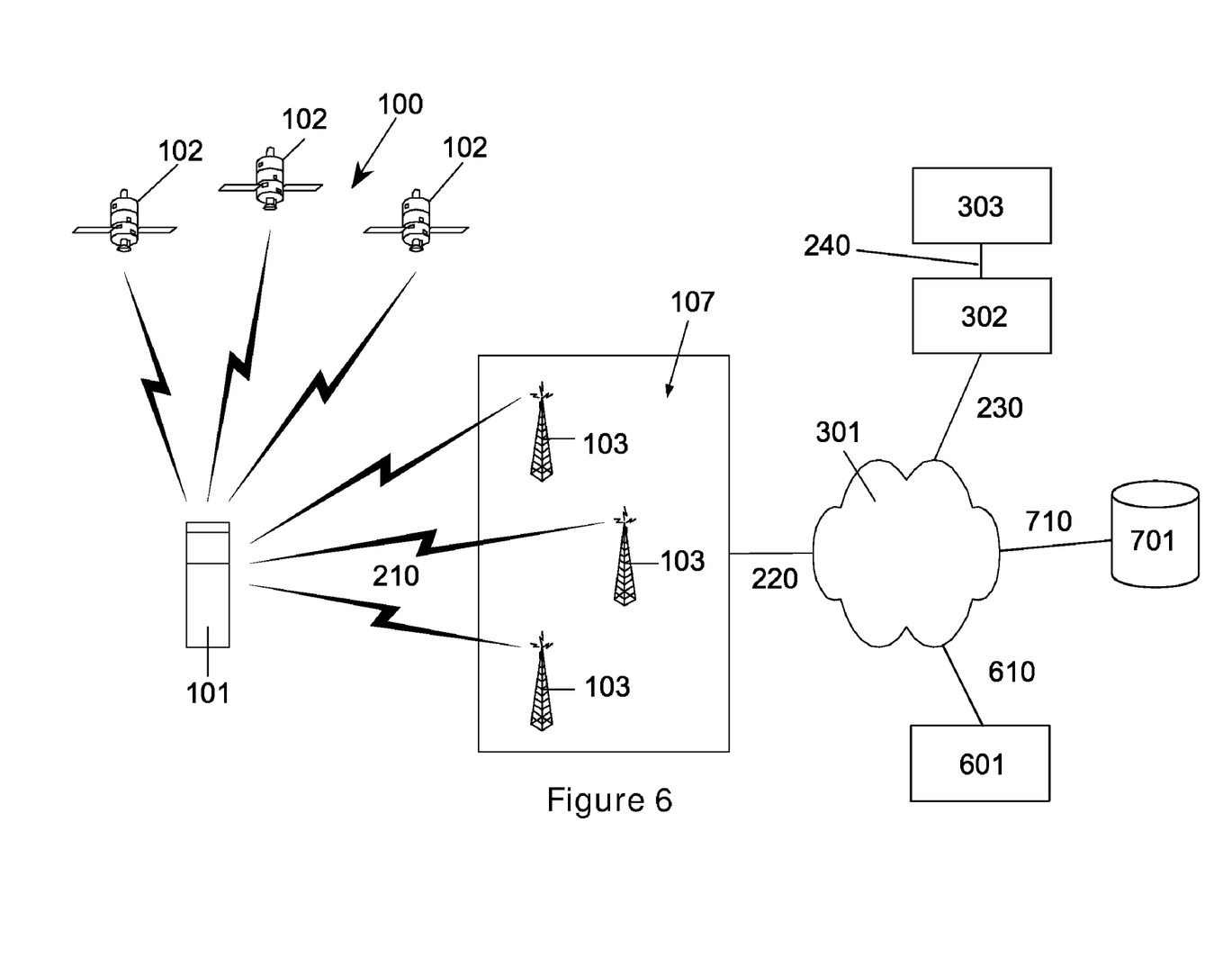
FIG. 6 is a diagram illustrating an alternative architecture in which the satellite position computation may be carried out by a device external to the terminal and with which the terminal communicates.

Yet another embodiment is illustrated in FIG. 6. In this case the GPS position calculation function is separate from the terminal 101 which communicates with an external position calculation device 701, via links 210, 220 and 710, that is used to compute the position of the terminal. The GPS timing measurements provided to the position calculation device 701 are measured within the terminal 101.

The invention claimed is:

1. A method of supplying position assistance information to a receiver of a satellite positioning system, contained within a mobile terminal having a timing reference, said mobile terminal being connected to a cellular communications network and also able to communicate via a bi-directional link with one or more remote devices capable of calculating position information, the method comprising the steps of:

(a) at a first location, where satellite signals are available, obtaining satellite position information of the mobile terminal from the satellite positioning system, storing said satellite position information within said terminal, measuring first time offsets, of the signals received by the terminal from a first plurality of transmitters of said cellular communications network, relative to each other or to the timing reference;

(b) sending said first time offset measurements to a remote device, calculating first terminal cellular position information in the remote device using said time offset measurements, and storing said first terminal cellular position information;

(c) at a second location, where signals from the satellite positioning system are not adequately available, measuring second time offsets, of the signals received by the terminal from the first or a second plurality of the transmitters of said cellular communications network, relative to each other or to the timing reference;

(d) sending said second time offset measurements to, and calculating second terminal cellular position information in, the or another remote device;

(e) retrieving the first terminal cellular position information and calculating a cellular position difference vector from the first and second terminal cellular position information, and sending the cellular position difference vector to the mobile terminal;

(f) adding said cellular position difference vector to the satellite position information stored within the mobile terminal and obtaining therefrom position assistance information of the mobile terminal at the second location; and (g) providing said position assistance information to the satellite receiver within the mobile terminal to aid the acquisition of satellite signals by the satellite receiver.

2. A method according to claim 1, wherein said first time offset measurements are stored in said remote device or devices.

3. A method according to claim 1, wherein said first time offset measurements are stored in a storage device connected to said remote device or devices.

4. A method according to claim 1, wherein the timing reference is a signal sent to the mobile terminal.

5. A method according to claim 4, wherein the timing reference is a signal sent to the mobile terminal from a transmitter of the communications network.

6. A method according to claim 1, further comprising, within the locale of the first location, obtaining multiple measurement information sets including measurements of the time offsets of the signals received by the mobile terminal from a plurality of the transmitters, assigning a time-tag to each measurement information set, obtaining motion information including a dynamical model of the motion of the terminal from the SPS measurements, removing the effects of the predicted motion from said measurement information sets using said motion information, and combining the corrected measurement information sets.

7. A method according to claim 1, further comprising, within the locale of the first location, obtaining multiple measurement information sets, including measurements of the time offsets of the signals received by the terminal from a plurality of the transmitters, from each of which measurement information set cellular position information is determined, assigning a time-tag to each of the measurement information sets, obtaining motion information including a dynamical model of the motion of the terminal from the SPS measurements, removing the effects of the predicted motion from said cellular position information using said dynamical model, and combining the corrected cellular position information to form an improved cellular position information.

8. A method according to claim 1, further comprising, within the locale of the first location, further combining the cellular position information with the motion information to obtain coherency indicator information which pertains to the degree of independence of the cellular measurement information sets from each other with respect to time or position, and using said coherency indicator information at the second location, to determine the extent of plural cellular measurement information sets used in the combining operation.

9. A method of determining the position of a mobile terminal of a satellite positioning system in which the satellite receiver is provided with calibrated terminal position assistance information in accordance with claim 1, and the position of the terminal is determined using at least one of the satellite signals.

10. A medium carrying a set of instructions which, when loaded into a terminal containing satellite positioning system components, enables the terminal to carry out the method of claim 1.

11. A system for supplying position assistance information to a mobile terminal satellite positioning system receiver adapted to obtain, where possible, satellite position information of the mobile terminal from a satellite positioning system, the satellite positioning system receiver being contained within a mobile terminal, and said system including
a mobile terminal having
a timing reference,
a receiver for connection to a cellular communications network,
a communication unit for communicating via a bi-directional link with one or more remote devices,
a storage unit for storing said satellite position information within said terminal,
a measuring unit for measuring first and second time offsets of the signals received by the terminal from one or more pluralities of transmitters of said cellular communications network, relative to each other or to the timing reference, at respective first and second locations of said terminal, and
a transmitting unit for sending said first and second time offset measurements to a remote calculation device;
a remote calculation device for calculating terminal cellular position information using said time offset measurements;
a storage device for storing terminal cellular position information;
a processing unit for retrieving terminal cellular position information from the storage device and calculating a cellular position difference vector from the first and second terminal cellular position information; and
a transmitting unit for sending the cellular position difference vector to the mobile terminal;
the terminal further including
a position determining unit for adding said cellular position difference vector to the satellite position information stored within the mobile terminal and obtaining therefrom position assistance information of the mobile terminal at the second location, and transfer unit for transferring said position assistance information to the satellite receiver within the mobile terminal to aid the acquisition of satellite signals by the satellite receiver.

12. A system according to claim 11, including a plurality of remote calculation devices for calculating terminal cellular position information using said time offset measurements.

13. A system according to claim 11, including a plurality of storage devices for storing terminal cellular position information.

14. A system according to claim 11, wherein said storage device is integrated with said calculation device.

15. A system according to claim 11, wherein the timing reference is a signal sent to the mobile terminal.

16. A system according to claim 15, wherein the timing reference is a signal sent to the mobile terminal from a transmitter of the communications network.

17. A system according to claim 11, wherein said processing unit is further adapted for
obtaining, within the locale of the first location, multiple measurement information sets including measurements of the time offsets of the signals received by the mobile terminal from a plurality of the transmitters,
assigning a time-tag to each measurement information set,
obtaining motion information including a dynamical model of the motion of the terminal from the SPS measurements,
removing the effects of the predicted motion from said measurement information sets using said motion information, and
combining the corrected measurement information sets.

18. A system according to claim 11, wherein said processing unit is further adapted for
obtaining, within the locale of the first location, multiple measurement information sets, including measurements of the time offsets of the signals received by the terminal from a plurality of the transmitters, from each of which measurement information set cellular position information is determined,
assigning a time-tag to each of the measurement information sets,
obtaining motion information including a dynamical model of the motion of the terminal from the SPS measurements,
removing the effects of the predicted motion from said cellular position information using said dynamical model, and
combining the corrected cellular position information to form an improved cellular position information.

19. A mobile terminal satellite positioning system receiver having
a timing reference,
a receiver for connection to a cellular communications network,
a communication unit for communicating via a bi-directional link with one or more remote devices,
a storage unit for storing said satellite position information within said terminal,
a measuring unit for measuring first and second time offsets of the signals received by the terminal from one or more pluralities of transmitters of said cellular communications network, relative to each other or to the timing reference, at respective first and second locations of said terminal,
a transmitting unit for sending said first and second time offset measurements to a remote calculation device;
a position determining unit for adding a cellular position difference vector received from a remote device to the satellite position information stored within the mobile terminal and obtaining therefrom position assistance information of the mobile terminal at the second location, and
transfer unit for transferring said position assistance information to the satellite receiver within the mobile terminal to aid the acquisition of satellite signals by the satellite receiver.

20. A receiver according to claim 19, a processing unit adapted for
obtaining, within the locale of the first location, multiple measurement information sets including measurements of the time offsets of the signals received by the mobile terminal from a plurality of the transmitters,
assigning a time-tag to each measurement information set,
obtaining motion information including a dynamical model of the motion of the terminal from the SPS measurements,
removing the effects of the predicted motion from said measurement information sets using said motion information, and
combining the corrected measurement information sets.

21. A receiver according to claim 19, a processing unit adapted for
obtaining, within the locale of the first location, multiple measurement information sets, including measurements of the time offsets of the signals received by the terminal from a plurality of the transmitters, from each of which measurement information set cellular position information is determined,
assigning a time-tag to each of the measurement information sets,
obtaining motion information including a dynamical model of the motion of the terminal from the SPS measurements,
removing the effects of the predicted motion from said cellular position information using said dynamical model, and
combining the corrected cellular position information to form an improved cellular position information.

* * * * *